United States Patent Office 2,841,617
Patented July 1, 1958

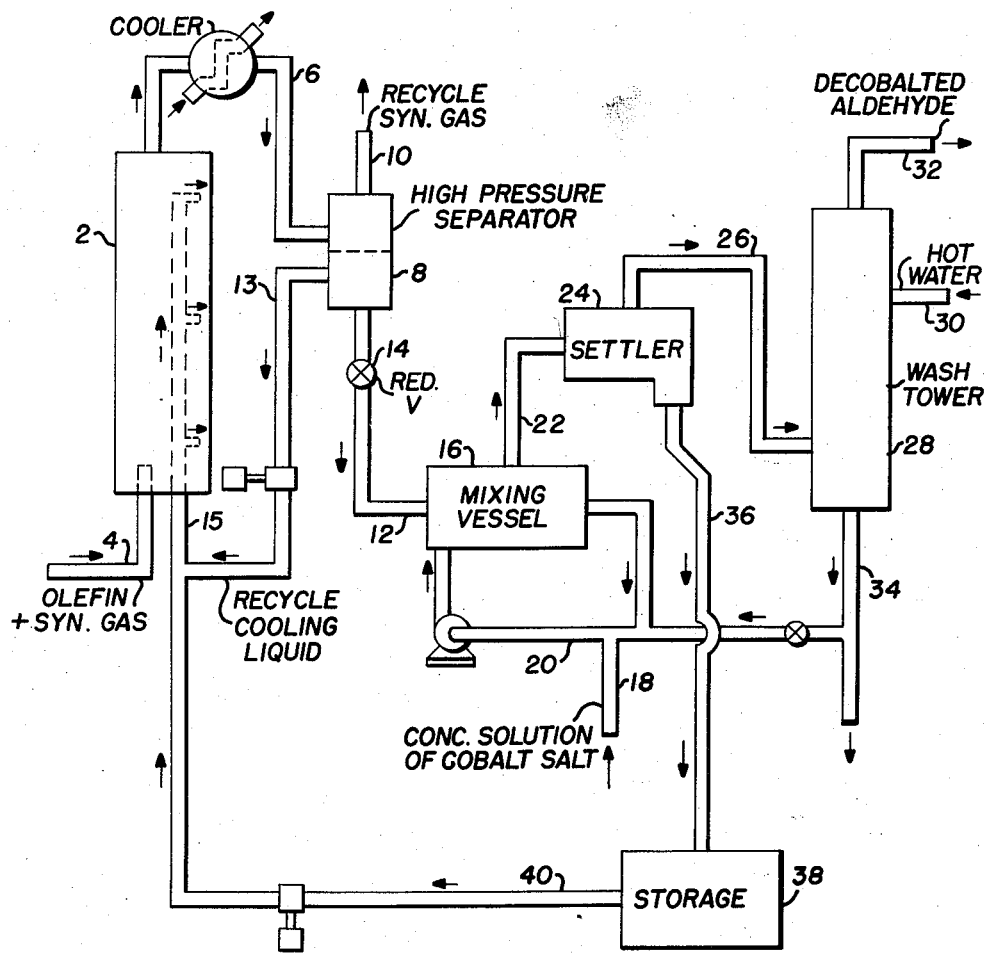

2,841,617

DECOBALTING PROCESS

Joseph Kern Mertzweiller, Baton Rouge, La., assignor to Esso Research and Engineering Company, a corporation of Delaware Application August 11, 1955, Serial No. 527,853

1 Claim. (Cl. 260—604)

The present invention relates to the preparation of organic compounds by the reaction of carbon monoxide and hydrogen with carbon compounds containing olefinic linkages in the presence of a carbonylation catalyst. More specifically, the present invention relates to the recovery of the cobalt catalyst utilized in the foregoing reaction from the product of the first stage of the cobalt carbonylation reaction for further use in the process.

In one of its embodiments, the present invention relates to a novel process of synthesizing complex salts from this catalyst. The present invention is a continuation-in-part of Serial No. 270,836, filed February 9, 1952, now U. S. Patent No. 2,744,936.

It is now well known in the art that oxygenated organic compounds may be synthesized from organic compounds containing olefinic linkages by a reaction with carbon monoxide and hydrogen in the presence of a catalyst containing metals of the iron group, such as cobalt, in an essentially three-stage process. In the first stage the olefinic material, catalyst, and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst is treated in a second stage to cause removal of soluble metal compounds from the organic material in a catalyst removal zone. The catalyst-free material is then generally hydrogenated to the corresponding alcohols or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins but most organic compounds possessing at least one non-aromatic carbon-carbon double bond may be reacted by this method. Thus, straight and branch-chained olefins and diolefins, such as propylene, butylene, pentene, hexene, heptene, butadiene, pentadiene, styrene, olefin polymers, such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the prior art processes is usually added in the form of salts of the catalytically active metal with high molecular fatty acids, such as stearic, oleic, palmitic, naphthenic, etc., acids. Thus, suitable catalysts are, for example, cobalt oleate or naphthenate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150°–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture and it is to this stage that the present principal invention applies.

From the catalyst removal zone, the reaction products comprising essentially aldehydes may be transferred to a hydrogenation zone and the products reduced to the corresponding alcohols in a manner known per se.

One of the problems involved in the aldehyde synthesis reaction is the fact that the catalyst metal, such as cobalt, though added as an organic salt, reacts with carbon monoxide under the synthesis conditions to form the metal carbonyl and hydrocarbonyl. There is basis for the belief that the metal hydrocarbonyl itself is in the active form of the catalyst. This dissolved catalyst must be removed prior to the subsequent hydrogenation, as otherwise it would separate out on the hydrogenation catalyst, plug transfer lines and heat exchangers, etc. The carbonyl remains dissolved in the reaction product from the primary carbonylation stage and is, therefore, removed in the catalyst removal or decobalting zone.

One way to remove the cobalt is by a thermal method wherein the accrued product in the first stage is heated to a temperature of from about 300°–350° F. Conveniently, a steam coil immersed in the liquid to be decobalted is employed. A pressure of from about 100–175 p. s. i. g. is maintained in the decobalting zone by the injection of a gasiform material, such as hydrogen, an inert vapor, etc., whereby the CO partial pressure is maintained at a relatively low value in the decobalting zone. Periodically, it is necessary to take the decobalter off stream to remove accumulated metallic cobalt to prevent plugging of feed lines and adjacent areas of the decobalting vessel. Furthermore, cobalt metal deposits as a film on the heating means and requires constant removal to prevent plugging of the pretreating equipment and surfaces. The removal of these films and deposited cobalt metal is a tedious and difficult process and adds significant cost to the economics of the carbonylation reaction. Furthermore, thermal decobalting usually did not completely remove soluble cobalt from the aldehyde product.

These difficulties were to a great extent removed, and a long step forward was taken, when it was found that when the aldehyde product comprising the reactor effluent from the carbonylation zone was treated with dilute aqueous solutions of organic acids, such as acetic or formic, whose cobalt salts are water soluble and oil insoluble, considerably more efficient decobalting was obtained with residual cobalt content of the aldehyde product less than 10 parts per million. The thermal decobalting process frequently left a feed for the subsequent hydrogenation process containing from 100–500 parts per million of dissolved cobalt. This resulted from the fact that though cobalt carbonyl is readily decomposed at the thermal conditions, other compounds of cobalt, such as cobalt soaps and salts, are quite stable at these temperatures. Cobalt salts, such as cobalt formate in the aldehyde product originate from the formation of secondary reaction products, such as formic and higher fatty acids in the course of the reaction and from the fatty acid cobalt soaps originally added as catalyst.

An important advantage of acid decobalting, besides the fact that lower temperatures are required than in thermal decobalting is that cobalt recovery is considerably simplified and made more feasible. Because of the strategic importance of this metal it is essential for an economically feasible process that substantially all the metal be recovered and reutilized. Thus, instead of precipitating the metal as a solid on packing, tubes, reactor walls, etc., as in the prior art processes, the effect of aqueous organic acid injection is to convert substantially all the cobalt present in the aldehyde product into a water-soluble form, regardless in what form cobalt is present in the aldehyde and this aqueous stream is readily separated from the decobalted product.

While this technique is quite effective, it suffers from two disadvantages. In the first place, the use of these relatively strong acids in aqueous solutions offers a corrosion problem requiring the use of expensive alloy steel equipment for reactors, tubings, and transfer lines. In the second place, acids have a potential catalytic effect in the presence of sensitive aldehydes, which may lead to some polymerization and aldol formation. Thirdly, it has been considered necessary to add enough acid to combine with at least all the cobalt present in the aldehyde product to produce the corresponding cobalt salt, such as cobalt acetate. However, the cobalt salts of the lower fatty acids have a limited water solubility, and therefore, there must be present enough water to dissolve all of the cobalt salts formed. This results in the recovery of quite dilute solutions of cobalt from the decobalting process.

The utilization of this aqueous cobalt stream, however, which may have a cobalt concentration of from 0.5–10%, poses several real problems. The most obvious and direct method of utilization consists of recycling directly the aqueous stream to the aldehyde synthesis reactor. This step, however, may be quite undesirable in that it introduces quantities of water into the reactor oven, and results in flooding and quenching of the reactor. Under certain circumstances a limited amount of water in the primary reactor may be beneficial, but under other circumstances, particularly when the cobalt concentration of the recovered aqueous stream is dilute, i. e., about 0.5–3% cobalt, flooding is very likely to occur if it is attempted to recycle enough to provide adequate catalyst concentration in the reactor oven corresponding to 0.1–0.5% cobalt on olefin.

As an alternate process, the aqueous cobalt solution may be converted prior to recycling to the reaction, into an oil-soluble cobalt form similar to the form in which it is initially introduced, i. e., the oil-soluble, high molecular weight fatty acid salt of cobalt, such as cobalt oleate, naphthenate, and the like. This avoids the necessity of recycling large amounts of water, but it is time-consuming and cumbersome.

The use of water-soluble organic salts of cobalt in the aldehyde synthesis process, the fact that their solubility even in water is quite low, and hence large amounts of solution would be necessary in order to introduce enough into the reactor for catalytic purposes, is associated with a further problem. As previously pointed out, the active catalyst is cobalt carbonyl or hydrocarbonyl, and this substance must first be synthesized in the reaction zone from the cobalt introduced therein; only after its formation does the aldehyde formation proper take place. The formation of the hydrocarbonyl, therefore, is the limiting factor in the reaction rate and thus throughput rates of gases and liquids are limited by the rate formation of cobalt hydrocarbonyl from the cobalt salt.

It is the principal purpose of the present invention to overcome the defects of prior art decobalting processes and to provide a novel process of decobalting.

It is also a purpose of the present invention to provide a means for removing and recovering cobalt catalyst from conversion products resulting from the reaction of olefins, CO and $H_2$, and efficiently reutilizing the recovered catalyst in the reaction.

It is another purpose of the present invention to supply catalyst to the aldehyde synthesis stage of the process in an active form.

It is a still further purpose of the present invention to prepare catalysts useful in the synthesis of carboxylic acids and their derivatives and other oxygenated compounds from olefins.

Other and further purposes, objects and advantages of the present invention will become apparent from the more detailed description hereafter.

It has now been found that cobalt dissolved in the aldehyde product may be recovered almost quantitatively by treatment of the aldehyde product with an aqueous solution of a cobalt salt, such as cobalt acetate. It has further been found that on such treatment the cobalt dissolved in the aldehyde product may be converted into a water-soluble form to give aqueous solutions containing considerably higher proportions of cobalt than could be obtained from saturated solutions of the low molecular weight fatty acid cobalt salts.

In the absence of air, cobalt hydrocarbonyl, which is the predominating form in which cobalt is present in the aldehyde product from the first stage, has a limited solubility in water of the order of a few tenths of a percent. Its solubility in aldehyde product is high. However, it has been found that when a cobalt salt is added to the water, a reaction occurs wherein the sparingly water-soluble cobalt hydrocarbonyl, $HCO(CO)_4$ which in water solution is present as the $Co(CO)_4^-$ ion, is converted into the very water soluble cobalt compound, in accordance with the reaction:

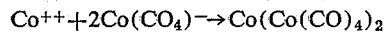
$$Co^{++} + 2Co(CO_4)^- \rightarrow Co(Co(CO)_4)_2$$

This reaction has been found to be substantially quantitative. The compound thus formed is practically insoluble in aldehyde product and thus efficient cobalt removal is achieved.

Of great significance is the fact that in accordance with the present invention, the aqueous solution thus recovered from the decobalting zone has a considerably higher cobalt concentration than is possible to obtain with the water-soluble salts of fatty acids, even the lowest ones. Thus, solutions containing 7–10% total cobalt may be obtained by this process, as against 2–6% when the cobalt acetate and formate salts are used. Thus, the amount of water that need be added to the first stage reactor is substantially and correspondingly lessened.

Furthermore, the form in which cobalt is added in accordance with the present invention is not only as a water-soluble catalyst, but also as one which does not require substantial pre-reaction to convert it into the active catalyst. For each cobalt cation there are two moles of combined cobalt anion which are already in the active state, i. e., as $Co(CO)_4^-$.

In accordance with the present invention, therefore, decobalting is accomplished by contacting cobalt-contaminated aldehyde product in a mixing zone with a solution of a cobalt salt in water. Suitable are water-soluble salts, i. e. those producing cobaltous ions in solution. However, it is generally preferable to employ the low molecular weight organic acid salts such as salts of carboxylic acids. Concentrations of cobalt are chosen to combine at least stoichiometrically with all the cobalt present in the aldehyde product as carbonyl; this may readily be determined by potentiometric titration.

In operation of this process, make-up catalyst is added therefore into the decobalting zone rather than into the reactor oven proper where it would first have to be converted into cobalt carbonyl.

The present invention in one of its aspects will best be understood from the more detailed description hereinafter, wherein reference will be made to the accompanying drawing which is a schematic representation of a system suitable for carrying out a preferred embodiment of the invention.

Turning now to the figure, olefin feed and synthesis gas are passed, after preheating in a fired coil (not shown), through feed line 4 to the bottom portion of primary reactor 2. The latter comprises a reaction vessel which may, if desired, be packed with non-catalytic material, such as Raschig rings, and may be divided into discrete packed zones.

Though catalyst is provided for the process in a manner more fully disclosed below, initially, catalyst may be supplied as an oil-soluble cobalt soap, such as cobalt oleate or naphthenate and the like. A convenient method for introducing catalyst may be as a solution in the olefin feed though also it may be introduced separately into reactor 2. It is added in amounts equivalent to about 0.1–0.5% of cobalt on olefin. As the process attains equilibrium, the extraneous oil-soluble cobalt is cut back and eliminated.

Synthesis gas comprising approximately equal parts of $H_2$ and CO is likewise introduced and flows concurrently or countercurrently with the olefin feed. Reactor 2 is preferably operated at a pressure of about 2500–3500 p. s. i. g. and at a temperature of about 200–450° F., depending upon the nature of the olefin feed and other reaction conditions.

Liquid oxygenated reaction products comprising mainly aldehydes having one more carbon atom than the olefin feed, and containing catalyst in solution and unreacted synthesis gas are withdrawn overhead from reactor 2 and transferred through line 6 with intermediate cooling, if desired, and passed to high pressure separator 8, where unreacted gases are withdrawn overhead through line 10 and preferably at least in part recycled.

A stream of primary reaction product containing dissolved therein relatively large amounts of cobalt carbonyl and other forms of cobalt is withdrawn from separator 8 through line 12 and pressure release valve 14, and the degassed aldehyde product is passed to mixer 16. However, prior to passage through valve 14, a portion of the stream from separator 8 is preferably recycled to reactor 2 via lines 13 and 15 for the purpose of supplying cooling liquid to control the reaction temperature. For this purpose, it is advantageous to recycle the cooled aldehyde liquid into various levels of reactor 2 to maintain temperature uniformity. Mixer 16 is of any conventional design, and is adapted to mix thoroughly an aqueous and a water-insoluble liquid organic phase.

A concentrated aqueous solution of a cobalt salt, ionized to give cobaltous ions, is passed into mixer 16 through lines 18 and 20. Suitable are most organic water soluble cobalt salts, but inorganic salts may also, but less desirably, be used. The cobalt salt is introduced in such quantities as to maintain at least a stoichiometric equivalent of cobaltous ion, $Co^{++}$, with respect to the $Co(CO)_4^-$ in mixing vessel 16. Pressures of about 0–200 p. s. i. g. and temperatures of about 50°–200° F., preferably 100°–185° F. obtain in vessel 16, and a residence time of about 10–120 minutes usually is sufficient to remove substantially all the cobalt from the aldehyde. Since 1 part by weight of cobalt as $Co^{++}$ is stoichiometrically equivalent to 2 parts by weight of cobalt as $Co(CO)_4^-$, and since cobalt losses through the system as by deposition on reactor packing, pipes and other surfaces, are generally such that not more than about 70% of the cobalt fed to the aldehyde synthesis stage enter the mixing vessel 16 with the aldehyde, it is ideal to add the makeup catalyst directly to the mixing vessel.

The temperature level within mixer 16 must not exceed about 200° F., and is preferably about 100°–185° F., to prevent thermal decomposition of cobalt carbonyl into the metal.

After sufficient mixing and recirculation, on the order of 10–120 minutes, the mixture is pumped through line 22 to settler 24, where the aqueous and aldehyde layers are allowed to stratify. Substantially all of the cobalt is in the lower aqueous layer. The aldehyde layer may then be passed to water washing equipment 28 via line 26, where hot water at about 165° F. may be injected through lines 30 to wash out the last traces of cobalt. About 10% wash water on aldehyde may be employed and the wash water, withdrawn through line 34 and containing small amounts of cobalt may be recycled in part to the mixer 16 as diluent or solvent for the cobalt salt added through 18.

Overhead from washing equipment 28 there is withdrawn through line 32 the substantially completely decobalted aldehyde product and the aldehyde product may then be passed to a hydrogenation oven (not shown). Hydrogen is supplied in proportion sufficient to convert the organic compounds to alcohols. Any conventional hydrogenation catalyst, such as nickel, copper chromite, tungsten or molybdenum sulfide, etc., either supported or unsupported may be employed. Pressures ranging from 1500–4500 p. s. i. g. and temperatures from 300–550° F. may be used, all in a manner known per se. If desired or necessary, the aldehyde product may be passed, instead of or in addition to the wash tower 28, to a clean-up thermal decobalting operation to clean up residual traces of cobalt.

Returning now to settler 24, the lower aqueous layer containing in solution the recovered cobalt substantially as $Co(Co(CO)_4)_2$, is withdrawn through line 36 and passed to storage vessel 38, where it may be accumulated for recycle back to the aldehyde synthesis reactor 2 through line 40. Inasmuch as the liquid is comparatively cool and also inasmuch as aldehyde has a greater water solubility than olefin, a preferred method of recycling the concentrated aqueous cobalt solution is to do so along with the recycle aldehyde cooling liquid, through line 15. Since the great proportion of the cobalt is already in the active form, it is safe to pass a part thereof to the upper part of reactor 2 along with recycled coolant, without danger of having the catalyst pass through the system in an unconverted form of which there is a danger when other forms of cobalt are employed as catalysts.

A particularly attractive embodiment of the present invention is the employment, in the decobalting step, of cobalt or other metal salts containing a complex cation. When the recovered cobalt is to be reemployed as a catalyst in the aldehyde synthesis reaction, complex salts of cobalt are preferably employed, such as those forming in aqueous solutions, the ions $[Co(NH_3)_6]^{++}$, $[Co(NH_2CH_2CH_2NH_2)_3]^{++}$ and their analogues and homologues. In general, in this case, these are salts containing as cations in addition to cobalt, basic nitrogen compounds. The anion may be hydroxyl, halogen, and the like. Most of these salts are water soluble, and in general are substantially more water soluble than the fatty acid salts such as the formate and the acetate. On the other hand, the complex salts of the cobalt hydrocarbonyl thus obtained are even more insoluble in the oxo aldehyde product than the simple cobalt salt of cobalt hydrocarbonyl, thus affording even more complete decobalting.

The decobalting reaction employing the complex may be formulated as follows:

$[Co(NH_3)_6]^{++} + 2Co(CO)_4^- \rightarrow$
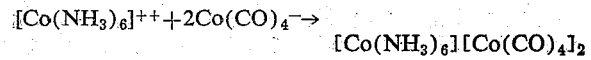
$[Co(NH_3)_6][Co(CO)_4]_2$ The cobalt complex salts may be added to the decobalter as a solution, in the manner heretofore described in connection with cobalt acetate and cobaltous ions in general, or the cobalt salt may be added as a solid.

When it is desired to employ the cobalt recovered from the aldehyde product in related syntheses, not only the cobalt cation complex, but also certain other salts containing complex cations may be employed. Thus the ferric and ferrous analogues of the cobalt amine salts mentioned above may be used. Also, in general the nitrogen, phosphorous and sulfur-containing organic complexes of cobalt, iron, zinc, copper, chromium and aluminum may be employed. The ammonia or amine type complexes of the above elements are among the most useful in the catalytic synthesis of carboxylic acids and their derivatives from olefins. In this reaction, a monoolefin is reacted with CO and a hydrogen-containing compound, such as alcohol, carboxylic acids, ammonia, primary and secondary amines in the presence of carbonyls at superatmospheric pressures and elevated temperatures. Particularly good results have been reported employing the complex metal salts of metal carbonyl hydrides, such as those described above.

Hitherto these salts have been prepared with difficulty and in a plurality of steps involving (1) treatment of aqueous solutions or suspensions of the metal salt or oxide with CO in the presence of ammonia, and (2) reacting the above material with a heavy metal complex salt. That is, the ammonium salt of the metal carbonyl hydride is reacted with the complex metal salt. By the process of the present invention these salts are easily synthesized while concomitantly decobalting the aldehyde product. Thus, in a preferred method of operation in accordance with this embodiment, the complex salt, such as cobaltous ammonium chloride, is added to the decobalter 16 in amounts sufficient to react with all the cobalt carbonyl present therein. Thorough agitation in the decobalter is desirable. The mixture is then pumped to settler 24 through line 22, and the aldehyde layer withdrawn through line 26 to washing equipment 28. The lower aqueous layer in settler 24, which may be a solution or a slurry of the complex salt of cobalt hydrocarbonyl is then passed to a synthesis zone where it serves to catalyze the carbonylation reaction described.

The invention admits of numerous modifications apparent to those skilled in the art.

The following examples illustrate the effectiveness of this process:

*Example I*

100 cc. of an aqueous solution of cobalt acetate containing 2.38 gms. of cobalt was placed in a bottle in a natural gas atmosphere and 475 grams of Oxo product (withdrawn directly from the high pressure system) representative of oxonation of a heptene fraction with cobalt oleate catalyst, was added and the mixture shaken vigorously for about 10 minutes at 90°–95° F. The layers were separated in a funnel and the aqueous layer analyzed by potentiometric titration. The total aqueous layer contained 2.3 grams of cobalt as the cobaltous ion and 0.336 gram of cobalt as the anion $Co(CO)_4^-$. Based on the aldehyde charged, the latter represented 0.0707 wt. percent or 44% of the total cobalt since the aldehyde contained 0.0900 wt. percent cobalt after extraction.

*Example II*

100 cc. of an aqueous solution of cobalt acetate containing 2.38 grams of cobalt was placed in a bottle in a natural gas atmosphere and 537 grams of Oxo product (from oxonation of a heptene fraction with a catalyst consisting of cobalt oleate and representative of the addition of about 2–3 vol. percent water to the Oxo stage), drawn directly from the high pressure system, was added and the mixture shaken at 90°–95° F. for 10 minutes. After separating the layers the total aqueous layer was found to contain 2.47 grams of cobalt as the cobaltous ion and 0.57 gram of cobalt as the anion $Co(CO)_4^-$. The aldehyde phase contained 0.04 wt. percent cobalt indicating removal of 71% of the cobalt as the anion $Co(CO)_4^-$.

*Example III*

100 cc. of an aqueous solution of cobaltous acetate containing 2.38 grams of cobalt was placed in a bottle and 484 grams of Oxo product (from oxonation of a heptene fraction with a catalyst consisting primarily of cobalt acetate) which contained 0.18 wt. percent cobalt was added and the mixture shaken vigorously for about 10–15 minutes at 90–95° F. The total aqueous layer from this test contained 2.50 grams of cobalt as the cobaltous ion, and 0.634 gram as the anion $Co(CO)_4^-$, while the aldehyde contained only 0.013 wt. percent cobalt. This represents a removal of 92% of the cobalt originally present in the aldehyde.

*Example IV*

100 cc. of an aqueous solution of cobaltous acetate containing 2.38 grams of cobalt was placed in a bottle and 503 grams of Oxo product (from oxonation of a heptene fraction with cobalt acetate catalyst) which contained 0.18 wt. percent cobalt was added and the mixture shaken about two minutes. The mixture was transferred to a shaker autoclave, placed in an atmosphere of synthesis gas, heated to 150° F. and shaken for two hours. After separation the total aqueous layer contained 2.57 grams of cobalt as the cobaltous ion and 0.527 gram of cobalt as the $Co(CO)_4^-$ ion. The aldehyde contained 0.0028 wt. percent cobalt, which corresponds to a removal of 98% of the cobalt from the aldehyde.

*Example V*

In order to determine the feasibility of decobalting with an aqueous cobalt solution in place of acetic acid, some additional data were obtained with cobalt acetate catalyst. The tests were made with and without the addition of acetic acid to the acid decobalting system when feeding a known composition of cobalt acetate (decobalter solution fortified with commercial cobalt acetate) as Oxo catalyst. Results of the tests are summarized in the following tabulation:

| Solution of | Catalyst | | Acid Decobalter Concentrate | | | |
|---|---|---|---|---|---|---|
| | | | Test A | | Test B | |
| Acetic Acid Rate to Decobalter, Gal./Hr | | | 2.1 | 2.1 | None | None |
| Sp. Gravity (78° F.) | 1.105 | 1.110 | 1.043 | 1.043 | 1.057 | 1.054 |
| pH of Solution | 4.95 | 5.35 | 4.00 | 4.05 | 4.35 | 4.35 |
| Total Acidity, Wt. Percent As Acetic Acid | 1.2 | 1.1 | 3.9 | 4.3 | 1.7 | 1.8 |
| Cobalt, Wt. Percent as Co++ | 3.96 | 3.91 | 1.66 | 1.75 | 1.70 | 1.63 |
| Cobalt, Wt. Percent as $Co(CO)_4^-$ | 1.52 | 1.74 | 0.44 | 0.48 | 1.82 | 1.60 |
| Percent of Total Cobalt as $Co(CO)_4^-$ | 28 | 31 | 21 | 22 | 52 | 50 |
| Cobalt Concentration in Acid Decobalted Product (Homogenized Sample), p. p. m | | | 86 | 107 | 128 | |

The data indicate that the composition of the Oxo catalyst solution was reasonably constant over the interval of the test and that it contained 1.1–1.2% free acid (calculated as acetic acid, but including all water soluble acids, e. g., acetic, formic and free cobalt hydrocarbonyl) and 28–31% of the total cobalt present as the hydrocarbonyl anion. The concentrate from the acid decobalting system (Test A) when feeding the designated catalyst solution to the Oxo stage and when injecting acetic acid into the acid decobalting system at a rate of 2.1 gal./hour contained 3.9–4.3 wt. percent total acid and only 21–22% of the cobalt as the hydrocarbonyl anion. When no acid was added to the decobalter, the effluent "cobalt acetate" contained 1.7–1.8 weight percent total acid and 50–52% of the cobalt as the hydrocarbonyl anion. Thus, it is indicated that the elimination of acid greatly increased the amount of decobalting taking place according to the extraction process.

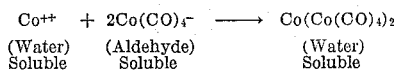

| Co$^{++}$ | + | 2Co(CO)$_4^-$ | → | Co(Co(CO)$_4$)$_2$ |
|---|---|---|---|---|
| (Water) Soluble | | (Aldehyde) Soluble | | (Water) Soluble |

The cobalt concentrations in the acid decobalted products indicate that decobalting was essentially unaffected by elimination of the acetic acid. These results are considered very encouraging as to the feasibility of eliminating acid from the decobalting system when operating with cobalt acetate catalyst.

Example VI

In general, complex salts of cobalt hydrocarbonyl may be prepared by mixing aqueous solutions of the cobalt hydrocarbonyl cobalt salt with aqueous solutions of salts of the complex cations. The cobalt hydrocarbonyl complex salts are generally insoluble in water and precipitate immediately or on standing.

In typical qualitative experiments dilute solution containing the nickel-O-phenanthroline and cobalticene cations respectively were treated with an aqueous solution containing the cobalt hydrocarbonyl anion. The latter solution was obtained from large scale cobalt removal operations in a commercial Oxo plant in which the cobalt-containing aldehyde was extracted with dilute acetic acid in the presence of carbon monoxide and hydrogen.

The nickel-O-phenanthroline gave an orange-red precipitate; formation and properties of this compound have been reported in the literature. The cobalticene (chloride) gave a brick red precipitate. Both of these products decomposed rapidly on exposure to air.

Example VII

This example illustrates the removal of cobalt from Oxo products by extraction with an aqueous solution containing a complex metallic cation.

A volume of 480 cc. of Oxo aldehyde was drawn directly into 100 cc. of an aqueous solution of nickel-O-phenanthroline reagent in an oxygen-free atmosphere. An orange precipitate formed on shaking. The mixture was allowed to stand overnight and the solid separated by filtration and dried carefully in an inert atmosphere. Analyses on the Oxo product were as follows:

Weight percent cobalt
Original Oxo product --- 0.018 (oil phase).
0.030 (oil and water phases).
Extracted Oxo product --- 0.001.

The dry precipitate amounted to 0.625 gram total. This is equivalent to 0.021 wt. percent cobalt based on the original aldehyde.

Example VIII

Results of semi-quantitative experiments using other complex cations as extractants are summarized in the following table. The aldehyde contained about 0.012 wt. percent cobalt in the oil phase and extractions were carried out at about 80° F. with considerable excess of the reagents.

| Test | Reagent | Precipitate | | Wt. Percent Cobalt in Extracted Aldehyde |
|---|---|---|---|---|
| | | Quantity | Color | |
| I | Cobaltous Ammonium Chloride. | Considerable. | Dirty Orange. | 0.005 |
| II | Cobaltic Ammonium Chloride. | ---do--- | ---do--- | 0.008 |
| III | Cobalticene Chloride. | Slight. | Brown. | 0.010 |

These data show that both cobaltous and cobaltic ammonio complex cations will extract the hydrocarbonyl anion at room temperature. They are apparently not as active as nickel-O-phenanthroline cation; the temperature is probably an important variable and extractions at elevated temperatures would favor more complete removal of cobalt from the aldehyde.

What is claimed is:

In a carbonylation process wherein olefinic carbon compounds are contacted in a carbonylation zone with carbon monoxide and hydrogen in the presence of a cobalt containing catalyst under elevated temperatures and pressures to produce aldehydic reaction products containing at least one more carbon atom than said olefinic compound and wherein a solution comprising said reaction products and dissolved cobalt catalyst is decobalted to remove and recover cobalt from the cobalt contaminated aldehydic product, the improvement which comprises contacting said contaminated aldehyde product with a complex salt containing in its cation a metal selected from the group consisting of cobalt and nickel, and a nitrogen compound selected from the group consisting of amines and ammonia, whereby a precipitate containing cobalt catalyst is formed and separating said aldehydic reaction product substantially freed of cobalt from said precipitate.

References Cited in the file of this patent

UNITED STATES PATENTS 2,744,936    Mertzweiller ----------- May 8, 1956